United States Patent

Prasad et al.

[11] Patent Number: 5,818,966
[45] Date of Patent: Oct. 6, 1998

[54] METHOD AND APPARATUS FOR ENCODING COLOR INFORMATION ON A MONOCHROME DOCUMENT

[75] Inventors: K. Venkatesh Prasad, Cupertino; David G. Stork, Stanford, both of Calif.

[73] Assignees: Ricoh Company, Ltd., Tokyo, Japan; Ricoh Corporation, Menlo Park, Calif.

[21] Appl. No.: 376,851

[22] Filed: Jan. 23, 1995

[51] Int. Cl.[6] .................................................. G06K 19/00
[52] U.S. Cl. ................. 382/232; 382/164; 358/467; 358/462; 283/72
[58] Field of Search ............................ 382/232, 166, 382/243, 110, 112, 164, 163; 355/326, 327, 328, 133, 32, 79, 88, 39, 40; 358/448, 450, 434, 515, 501, 540, 334, 333, 332, 539, 517, 462, 500, 534, 470, 435, 467; 380/18, 51; 283/901, 114, 72, 91, 95; 347/900

[56] References Cited

U.S. PATENT DOCUMENTS

| | | | |
|---|---|---|---|
| 3,306,974 | 2/1967 | Cunnally | 350/168 |
| 3,655,908 | 4/1972 | Goldberg et al. | 386/43 |
| 4,689,696 | 8/1987 | Plummer | 386/43 |
| 4,876,571 | 10/1989 | Nakamura et al. | 399/84 |
| 5,227,893 | 7/1993 | Ett | 358/400 |
| 5,337,362 | 8/1994 | Gormish et al. | 380/54 |
| 5,361,143 | 11/1994 | Nakayama et al. | 358/500 |
| 5,452,002 | 9/1995 | Mu et al. | 348/273 |
| 5,506,697 | 4/1996 | Li et al. | 358/448 |
| 5,557,430 | 9/1996 | Isemura et al. | 358/501 |

Primary Examiner—Scott Rogers
Assistant Examiner—Brian P. Werner
Attorney, Agent, or Firm—Blakely, Sokoloff, Taylor & Zafman LLP

[57] ABSTRACT

A method and apparatus for encoding color information in monochrome (black and white) documents. The present invention includes a method and apparatus to produce color documents that interprets color information stored on a document containing an image in monochrome and generates an image in color based on the color information.

30 Claims, 6 Drawing Sheets

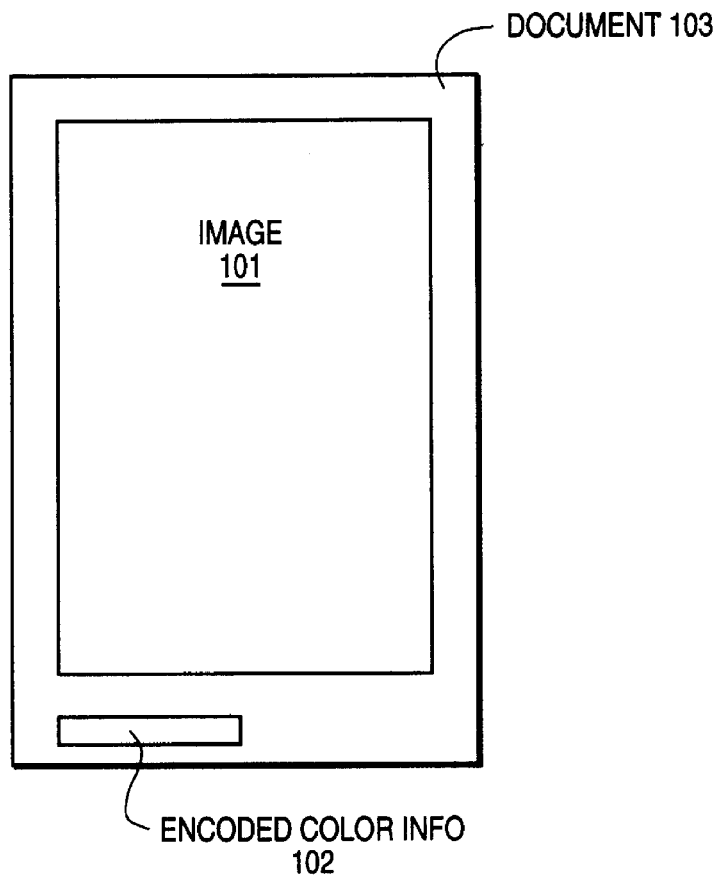
FIG_1
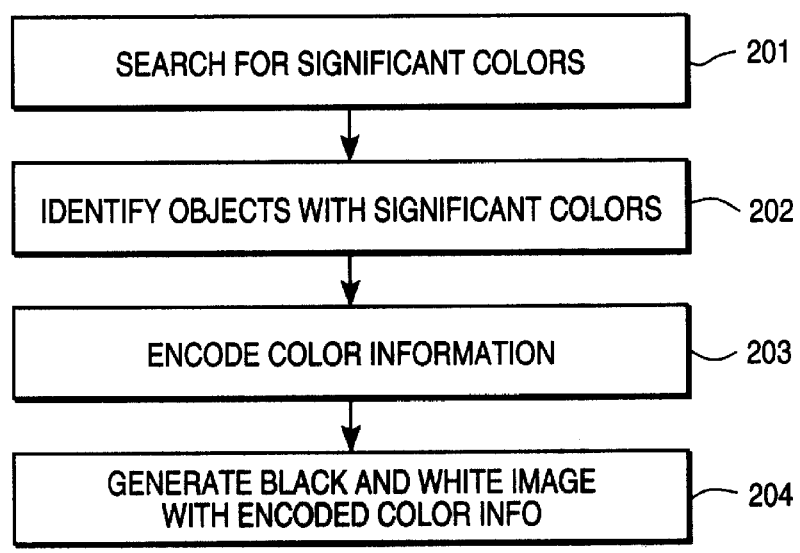
FIG_2

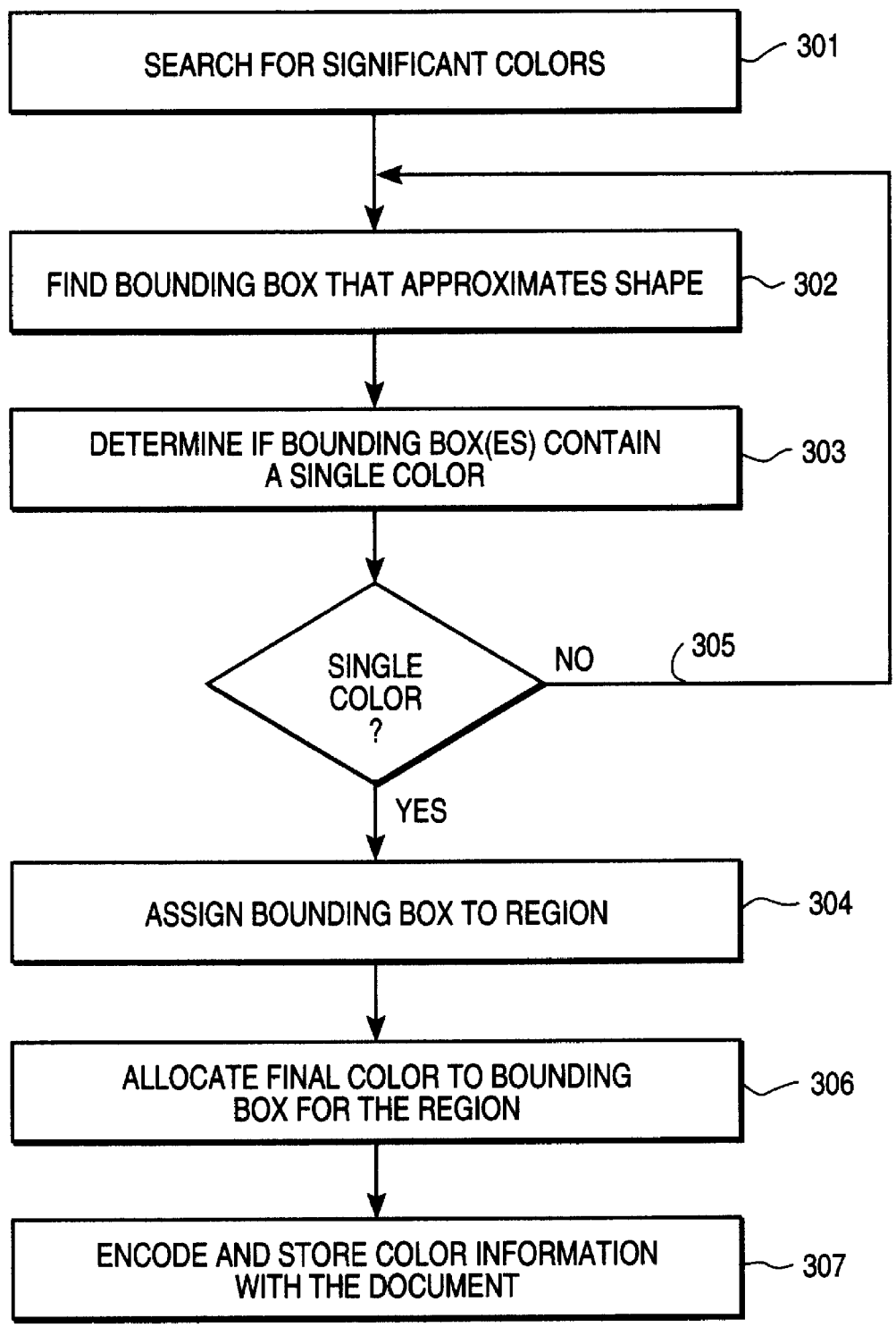
FIG_3

| LLx | LLy | URx | URy | OT | Cl |
|---|---|---|---|---|---|
| 132 | 534 | 213 | 628 | 0 | 155 |
| 166 | 502 | 438 | 531 | 0 | 158 |
| 99 | 476 | 133 | 492 | 0 | 160 |
| 225 | 476 | 253 | 492 | 0 | 162 |
| 360 | 478 | 388 | 491 | 0 | 164 |
| 98 | 463 | 287 | 475 | 0 | 166 |
| 193 | 434 | 272 | 446 | 0 | 155 |
| 307 | 433 | 382 | 446 | 0 | 160 |
| 217 | 403 | 248 | 417 | 0 | 155 |
| 97 | 389 | 189 | 401 | 0 | 158 |
| 107 | 313 | 125 | 341 | 0 | 189 |
| 133 | 191 | 161 | 385 | 0 | 189 |
| 170 | 202 | 188 | 303 | 1 | 155 |
| 188 | 202 | 206 | 276 | 1 | 189 |
| 206 | 202 | 224 | 235 | 1 | 222 |
| 233 | 199 | 254 | 277 | 1 | 155 |
| 254 | 199 | 271 | 302 | 1 | 189 |
| 271 | 199 | 289 | 255 | 1 | 222 |
| 299 | 199 | 319 | 380 | 1 | 155 |
| 319 | 199 | 336 | 316 | 1 | 189 |
| 336 | 199 | 355 | 299 | 1 | 222 |
| 364 | 199 | 384 | 316 | 1 | 155 |
| 384 | 199 | 401 | 344 | 1 | 189 |
| 401 | 199 | 420 | 276 | 1 | 222 |
| 126 | 133 | 185 | 154 | 1 | 155 |
| 126 | 111 | 185 | 129 | 1 | 189 |
| 126 | 88 | 185 | 108 | 1 | 222 |
| 301 | 108 | 358 | 166 | 1 | 222 |
| 358 | 54 | 417 | 169 | 1 | 155 |
| 297 | 49 | 382 | 116 | 1 | 189 |

FIG_4

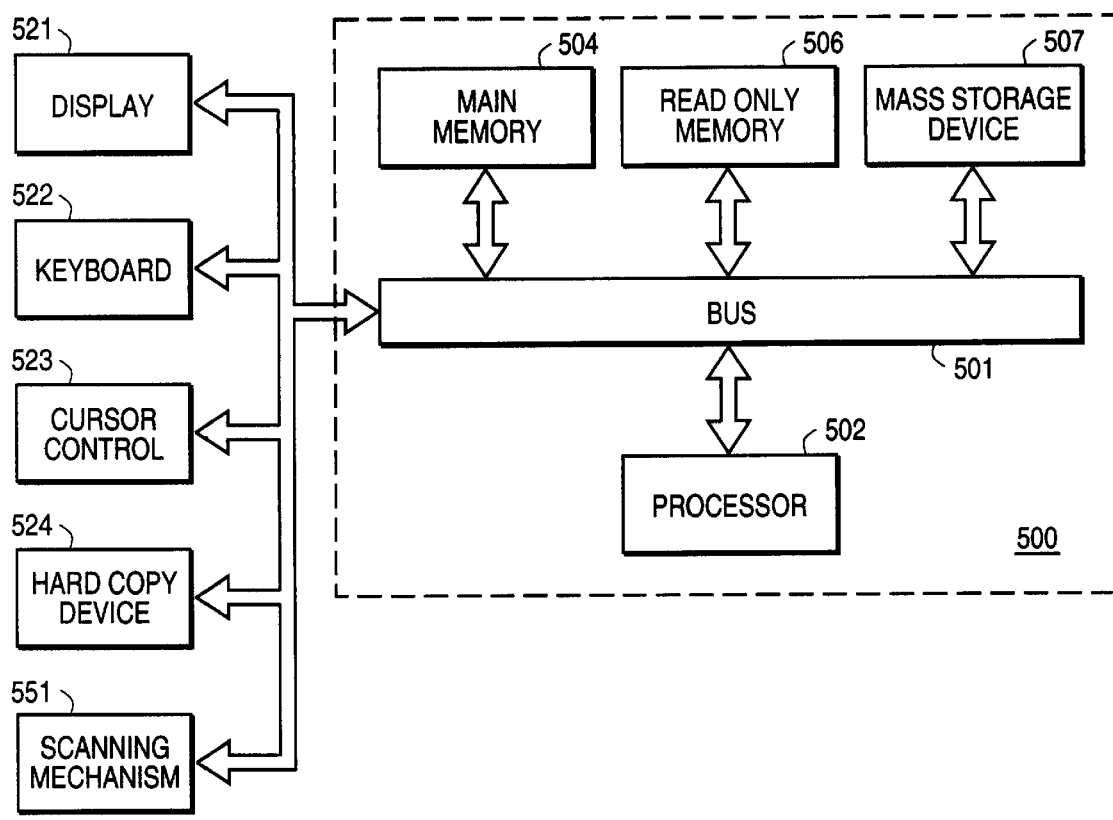
FIG_5

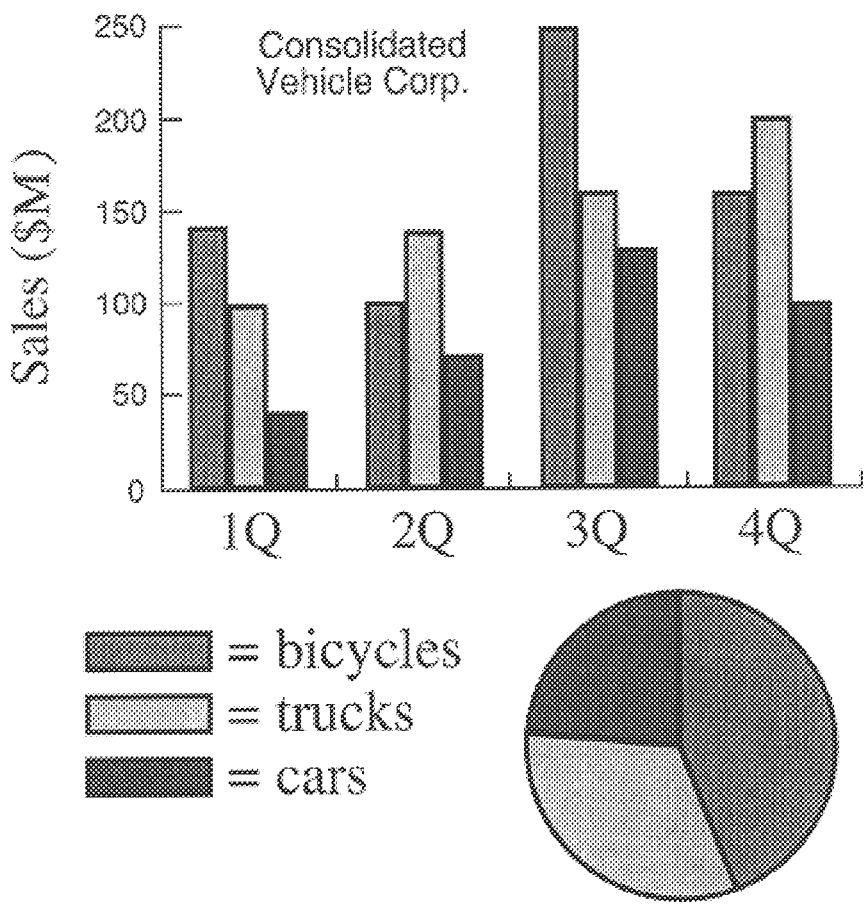
FIG_6

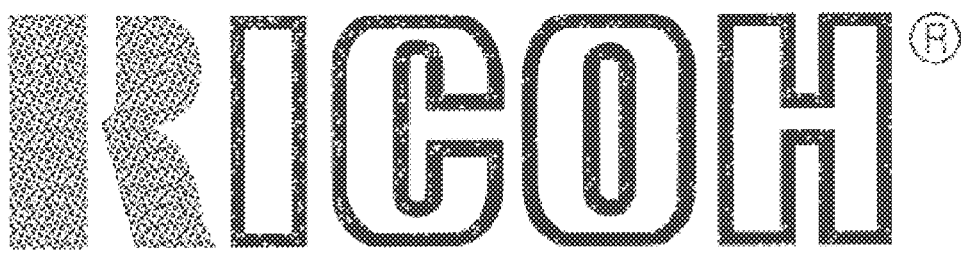
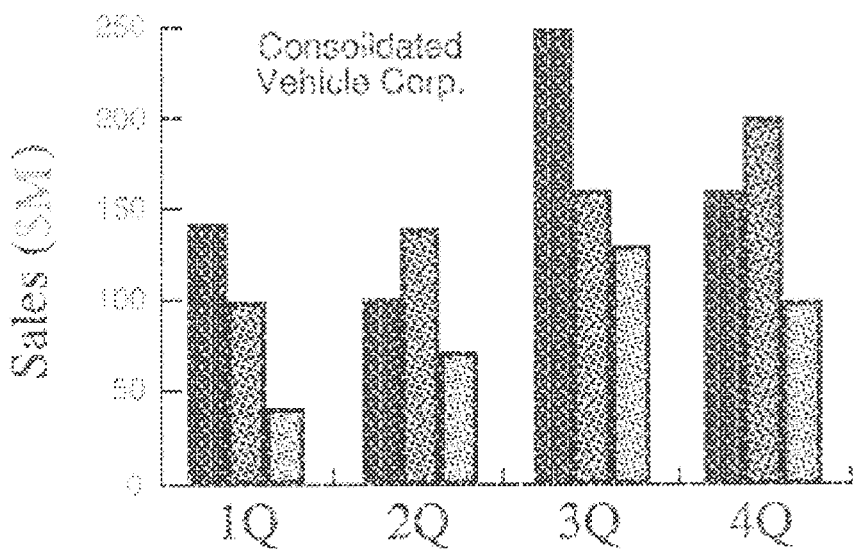
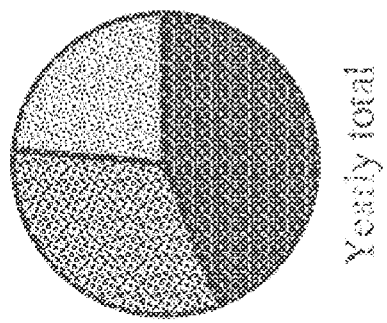
FIG_7

METHOD AND APPARATUS FOR ENCODING COLOR INFORMATION ON A MONOCHROME DOCUMENT

FIELD OF THE INVENTION

The present invention relates to the field of data encoding; more specifically, the present invention relates to encoding and transporting color information of a document or image in a black and white version of that document or image.

BACKGROUND OF THE INVENTION

Currently, most printers, copiers and facsimile machines operate with monochrome (black and white) information. In other words, most printers that are used print black and white documents; most copiers copy documents into a monochrome document; most facsimile machines print faxes received in monochrome.

Many printers, copiers and facsimile machines are available today that provide and accommodate color information. However, these devices are generally more expensive than the ones that handle monochrome information only. Therefore, it is likely that there will always be a demand for those devices that operate with and produce monochrome information. However, it is desirable to be able to have both types of documents accessible when the proper machines are available. That is, it is desirable to be able to provide documents that may be printed in monochrome fashion and also in color when those machines are available. Also, it is therefore desirable to be able to print out or obtain a copy of a color document in a black and white format and using that document thereafter be able to obtain a color rendition of the original document.

Current transmission of documents via such devices as facsimile machines is performed over common phone lines. Facsimile machine are able to send and receive color documents. However, the cost of sending and receiving monochrome documents is significantly less than that of color. Thus, to reduce cost, it is desirable to be able to send a black and white document by facsimile or other document transmission system, while being able to create a color rendition from the black and white document received at a later time, if so desired.

Document production, such as journals or other document displays, often use color documents when available. However, the cost of displaying color as opposed to a black and white document is often greater. When a color document is only going to be viewed by a small number of people, the cost of printing the color image for all journal recipients may be prohibitive. A black and white version, on the other hand, may be cheaply printed. Therefore, it is desirable to use a black and white document but have the color version available to allow individuals desiring color copies to obtain those color renditions if they so desire while bearing their own costs.

The present invention provides for creating monochrome documents from color documents. The monochrome version of the document contains information indicating the color content of the original color document. This color information allows for the reconstruction of the original color image. In this manner, people who have access to printers, fax machines, copiers and other such hardcopy and document processing devices than can accommodate color images and documents may print out the color version of a document, while those who only have access to those machines that produce monochrome documents may then print out the non-color version of the document or color versions (if the necessary facilities are available to them). Furthermore, the present invention provides a system whereby documents may be presented in monochrome and an individual may be able to generate their own colorized version of the document.

SUMMARY OF THE INVENTION

A method and apparatus for encoding color information in monochrome (black and white) documents is described. The present invention includes a method and apparatus to produce color documents that interprets color information stored on a document containing an image in monochrome and generates an image in color based on the color information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates an example of a document of the present invention that contains encoded color information.

FIG. 2 is a flow diagram of one embodiment of the process for creating a monochrome document according to the teachings of the present invention.

FIG. 3 is a flow diagram of an alternate embodiment of the present invention of the process for creating a monochrome document.

FIG. 4 is an example of a matrix that is stored and contains the color information for a document according to one embodiment of the present invention.

FIG. 5 is a block diagram of one embodiment of the computer system of the present invention.

FIG. 6 is an exemplary gray-level image printed according to the teachings of the present invention.

FIG. 7 is an exemplary color image rendered using the encoded color information that is on the image in FIG. 6.

DETAILED DESCRIPTION OF THE PRESENT INVENTION

A method and apparatus for encoding color information in monochrome (black and white) documents is described. In the following detailed description of the present invention numerous specific details are set forth, such as encryption techniques, numbers of bits, dimensions, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides a method and apparatus for producing a monochrome (e.g., black and white) image from a color image where the color information from the color image is encoded and stored on the monochrome image. In one embodiment, the present invention creates a black and white document from a color document and the newly created document includes encoded color information that may be used by a party to create a color version of the black and white document. The color version may be identical to the original color document. In an alternative embodiment, where a color palette representing the possible colors that might be included in the encoded color information has less colors than were used in the original, the color version may not be a duplicate, as far as color is concerned, of the original.

The color information accompanies the black and white document to allow anyone with the proper decoding facilities to create a color version of the document. In one embodiment, the encoded color information is carried in a sidechannel in a document. By reading the sidechannel information along with the spatial image of the document, an individual is able to produce the color document. An example of such a document is shown in FIG. 1 where a black and white image 101 with encoded color information 102 appears on document 103. Any individual that has a system, such as a facsimile machine, copier, printer, etc., that is capable of receiving the document and reading the image and processing the encoded color information may obtain a color version of the monochrome document.

Creating a Monochrome Document with Color Information

FIG. 2 is a flow diagram of one embodiment of the process for creating a monochrome document of the present invention from an original color image. Referring to FIG. 2, the present invention begins by searching for any significant color in the document (processing block 201). In one embodiment, any significant color is defined as a color other than black or white. Once the significant colors have been identified, the present invention identifies the objects in which the significant colors are found or exist (processing block 202). The present invention then processes the color information into encoded color information (processing block 203) and then generates a monochrome version of the original document which contains encoded color information to enable an individual to create or recreate a color version of the monochrome image (processing block 204). In one embodiment, the location and color of the objects are stored in the sidechannel of the document.

Objects may include characters, images and line drawings. The present invention represents the objects in terms of an object type. Each object type represents a color procedure necessary to recreate a color version of that shape from the monochrome document. Color procedures may operate based on boundaries or locations on the document itself. For instance, a rectangular object may be defined in terms of its two opposite corners, while a circle may be defined in terms of center and radius. Another object type might be defined by a set of boundaries into which a color is painted. For instance, an object type may be defined as a painting (e.g., coloring) process where painting starts at one point and continues to a boundary at which time the direction of painting changes and painting continues until another boundary is reached, and so on. In this manner, the type of object is identified as a series of boundaries and directional paint operations. Objects may be identified as a series of several shapes that represent a particular portion of an image. The present invention is not limited to using a particular series of object types, and any method of applying colors in a restricted region may be used.

In the present invention, there are numerous ways in which an area in the document may be selected as an object. For instance, if the document is already input into a computer system, objects may be identified by initial identifying areas of the document having a single color (e.g., by examining the color of each pixel). The present invention may identify objects in an image by their borders. For instance, by examining the color of pixels and comparing their pixel values with a set of thresholds, the present invention may identify borders of objects, which, in turn, define each object.

Once objects have been identified, a color is associated with each of the objects. In one embodiment, a color is identified by their pixel values. In one embodiment, the colors chosen to represent the area is selected from a group of colors in a specific color palette used for the document. The color palette may have a limited number of colors. By limiting the number of colors available, the present invention is able to reduce the color information so that it may be stored in a smaller portion of the document. For instance, using a color palette with ten colors allows the encoded color information represented using bar codes to be represented in a space of approximately ¾×4 in. on a typical 8½×11 in. sheet of paper.

If the number of colors used to represent any possible color of an object in a document is less than the number of colors that actually appear in the document or if the colors used to represent colors of objects in a document are not identical to those colors used to represent colors in the document, thresholds may have to be set up to associate a color in the color palette with colors that may appear in the document. The thresholds may be pixel values, such that the color of an area in the document having a pixel value that falls into a specific range of pixel values is identified as having the color of a pixel used to represent the entire pixel value range. Note that in such a case, it may not be possible to recreate a color rendition that is identical to the original.

Using the identified colors, a color procedure can be associated with the object, identifying the color procedure by a label. Thereafter, a location is associated with the color procedure which identifies the color and shape to be rendered with its location in the document. This information may then be encoded.

The present invention encodes the object type, location of the object on the document, and its color into the encoded color information of the present invention. In one embodiment, the color information is encoded into machine readable information. The machine readable information may be in a digital format, such as a bar code or digital paper, one embodiment of which is described in U.S. Pat. No. 5,337,362, entitled "Method and Apparatus for Placing Data Onto Plain Paper", issued on Aug. 9, 1994, and assigned to the corporate assignee of the present invention. Other types of encoding may be used in the present invention as long as identification and selection of links are possible.

FIG. 3 is an alternative embodiment of the process of the present invention. Referring to FIG. 3, the process has the same first processing step as in FIG. 3. However, once significant colors are found (processing block 301), the present invention attempts to identify a "bounding box" or approximate shape from a set of such "boxes" that may be used to approximate or characterize the shape or region having that particular color (processing block 302). After bounding boxes have been identified, the present invention determines if the colored pixels in the bounding box are the same color (processing block 303). If so, then the region is assigned that type of bounding box (processing block 304). If not, the search for another bounding box occurs (processing block 305). Then, a final color is allocated from among a set of available colors (e.g., from in a look up table) and thereafter associated with that bounding box (processing block 306). The location, bounding box and assigned color for each color area in the document are then encoded and stored on the monochrome document (processing block 307).

One Embodiment of the Present Invention

In one embodiment, a document contains a total of N objects, which may include, for example, characters, images, and line drawings and other shapes or graphical features. If the number of color objects is small, a vector may be defined for each of the colored objects. For instance, the vector $d_n$ is a vector descriptor of the nth colored-object. In one embodiment, the entire color-content of the document is described by a Document Color Content Matrix: $D \in \Re_{n \times 6}$, with rows composed of the vectors $d_n$ defined in equation 1 below. The vector $d_n \in \{\Re_4, Z_2\}$ is defined by six elements: four real-valued coordinates and two integer-valued indexes:

$$d_n = \begin{bmatrix} \text{lower-left}_x \\ \text{lower-left}_y \\ \text{upper-right}_x \\ \text{upper-right}_y \\ \text{object-type} \\ \text{color-index} \end{bmatrix} = \begin{bmatrix} LL_x \\ LL_y \\ UR_x \\ UR_y \\ OT \\ CI \end{bmatrix}, \quad (1)$$

where the first four elements define the x and y coordinates of the lower-left and upper-right corners of a bounding box of the object. The fifth element is a binary (or more generally integer) index representing the object type (OT). In one embodiment, the object type OT equals 0 if the object has no distinct border-pixels (in gray-level) or is set to one if the object has distinct border-pixels. Other types of indexing may be used and are well-known in the art. The sixth element is a one-byte integer in the range (0,255). If two bytes to represent each of the first four elements, the vector $d_n$ requires no more than 10 bytes. Note that in alternative embodiments, the vector $d_n$ may include more or less elements.

In the present invention, the matrix D is generated from the original colored document and is encoded into a side-channel of the gray-scale (monochrome) document. When a color rendition of the document is desired, the document is scanned and the sidechannel information is decoded to retrieve matrix D. Based on the information stored in matrix D, the present invention restores color to the document.

The bounding box coordinates described in equation 1 above refer to "points" in the document image-space. By default, these points map onto single pixels. By the addition of an element to the vector $d_n$, such as a canvas-grid-resolution parameter, the pixel-area onto which each bounding box point maps can vary. In this manner, the accuracy with which we specify the bounding box coordinates can vary.

Encoding and Decoding Color Content

Once generated, the Color Content matrix D is encoded. As stated above, the color information may be encoded into a machine readable digital format, such as a bar code or digital paper, one embodiment of which is described in U.S. Pat. No. 5,337,362, entitled "Method and Apparatus for Placing Data Onto Plain Paper", issued on Aug. 9, 1994, and assigned to the corporate assignee of the present invention.

The encoded information is then printed and/or coupled for presentation with a black and white version of the original document (e.g., image of the document).

When an individual desires a color rendition of the document, the individual causes the encoded information to be scanned, using, for instance, manually-operated controls, and decoded. One example of the resulting matrix D is shown in FIG. 4.

The Color Restoration Procedure of the Present Invention

In one embodiment, the present invention performs color restoration based on pixel intensity. Based on its intensity (p(x,y)), a given pixel in a document image is assumed to fall into one of the following three regions, ground, figure or border:

$$\text{if } p(x, y) \begin{cases} \leq (G + \sigma_G) & \rightarrow \quad \text{ground} \\ \begin{pmatrix} > (G + \sigma_G) \\ \text{and} \\ < (B - \sigma_B) \end{pmatrix} & \rightarrow \quad \text{figure} \\ \geq (B + \sigma_B) & \rightarrow \quad \text{border} \end{cases} \quad (2)$$

where G and B are pre-defined thresholds that define the ground and border pixel-intensities and the $\sigma_G$ and $\sigma_B$ terms are the square-roots of the variances of the ground and border pixel-intensities, respectively. Using the above pixel classification, the present invention initially checks the object type of each row of matrix D.

In one embodiment, if the object type is of a first type (object-type=1), then the object has a border. This implies that moving down a given column of the object, the figure-pixels are bracketed or surrounded by a pair of border-pixel clusters (borders) where the pair contains both odd and even borders. For each column of the object, the present invention first identifies the odd border, then identifies the even border. Then having located the even border, the present invention paints the pixels in the region between the borders. Afterward, the present invention resets the border counters, and looks for additional regions to paint, before moving on to the next column of the object. Using the procedure of the present invention circumvents the problem of uncontrolled "bleeding" that might result in large portions of the ground pixels getting painted.

If the object type is of a second type (object-type=0), then the object is defined by being ground and figure pixels and the definition of the figure-pixels is simplified to mean any non-ground pixel. All figure pixels in the object are painted.

One Embodiment of the Computer System of the Present Invention

The processing logic to perform the various steps of object identification, color identification, encoding, etc. may be performed by a system containing hardware and/or software. The system may be a computer system. The processing logic of the present invention may be incorporated into printing devices, facsimile devices, copying devices and other hardcopy and document display devices. In one alternative embodiment, the present invention may be coupled to such devices and provide data to document display thereby. A block diagram of one embodiment of the computer system of the present invention is described below in conjunction with FIG. 5.

Referring to FIG. 5, one embodiment of the computer system of the present invention is implemented is shown as 500. Computer system 500 comprises a bus or other communication means 501 for communicating information, and a processor 502 coupled with bus 501 for processing information.

System 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502, and a data storage device 507 such as a magnetic disk or optical disk and its corresponding disk drive. Data storage device 507 is coupled to bus 501 for storing information and instructions.

Computer system 500 may further be coupled to a display device 521, such as a cathode ray tube (CRT) or liquid crystal display (LCD) coupled to bus 501 for displaying information to a computer user. An alphanumeric input device 522, including alphanumeric and other keys, may also be coupled to bus 501 for communicating information and command selections to processor 502. An additional user input device is cursor control 523, such as a mouse, a trackball, stylus, or cursor direction keys, coupled to bus 501 for communicating direction information and command selections to processor 502, and for controlling cursor movement on display 521. Another device which may be coupled to bus 501 is hard copy device 524 which may be used for printing instructions, data, or other information on a medium such as paper, film, or similar types of media.

Computer system 500 may also include a scanning mechanism 551 for scanning documents for data input into the computer system.

Note that any or all of the components of system 500 and associated hardware may be used, however, it can be appreciated that any type of configuration of the system may be used for various purposes as the user requires.

Processor 502, in cooperation with the other components in computer system 500, executes instructions and processes information to perform the document processing described above.

The size of the memory in the computer system used to hold the encoded color information depends on the amount of information. For instance, the 30-row matrix D shown in FIG. 4 would require 30×10 bytes of sidechannel memory. Note that these 300 bytes of sidechannel memory translates to approximately 2 square inches of machine readable information (digital paper).

An Example of the Use of the Present Invention

FIG. 6 is an exemplary gray-level image, printed on a 600 dpi printer. The colored image objects appear with dithered/halftone patterns. The gray-level image comprises 30 colored objects, described by the 30 matrix in FIG. 4, representing xxx bytes (uncompressed). Note that there were only six colors used. In one embodiment, the bar code would contain a header, choosing a color palette. In this case, a palette with only six colors would have been used, and thus, the entries in the CI column would be in the range 0–5, giving added compression.

After scanning the 600 dpi print at 200 dpi, strong Moire patterns were observed in the scanned image. The border-pixel definition is required because the Moire patterns in the scanned image have a large pixel intensity variations. This sometimes results in figure pixels getting mis-classified as ground pixels and hence, not getting painted.

FIG. 7 illustrates the painted image after undergoing the color restoration process of the present invention. The painted image is 72 dpi color image. In one embodiment, the color image may be saved as 72 dpi PhotoShop file to facilitate printing. Referring to FIG. 7 appears very coarse.

Therefore, the present invention allows color information to be transported through a black and white medium. Even though color can be transported to the desired objects, the image quality may not be as high as the original color image. The quality can be vastly improved if more memory and computational time is allocated to the process. For instance, the original image may have to be printed at 300 dpi, while scanning of the image occurs at 600 dpi. Thereafter, when a color rendition of the image is desired, the image may have to be printed at full (300 dpi) resolution.

Furthermore, the present invention allows for conversion back and forth between color and black and white copies of documents and images. Using the present invention, documents such as, for instance, journal articles can be printed in black and white, and later rendered into color by only those readers who require it. Also the present invention allows color images to be faxed easily over installed black and white fax machines. Later those images may be rendered into color. Also the present invention permits business graphics to be printed in black and white, while obtaining color versions later.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a method and apparatus for encoding color information has been described.

We claim:

1. A method for generating a first document from a second document that is colored, the method comprising the steps of:

identifying a plurality of colored objects in the second document;

generating a vector for each of said plurality of colored objects, wherein each vector comprises:

coordinates of a bounding box in the document image space that at least approximates shape of an object, and an object type indicator;

encoding the color content and the vectors of the plurality of colored objects to produce encoded color content information;

creating the first document having objects of the second document in monochrome and having the encoded color content information for each object printed in monochrome on the first document.

2. The method defined in claim 1 wherein the step of encoding comprises the steps of:

creating a set of vectors describing the color content of the second document; and encoding the set of vectors to produce the encoded color content information.

3. The method defined in claim 1 further comprising the step of placing the encoded color content information in a side channel of the first document.

4. The method defined in claim 1 wherein the encoded color content information comprises machine readable information.

5. The method defined in claim 1 wherein the encoded color content information comprises information identifying a color palette upon which the encoded color content information is based.

6. The method defined in claim 1 wherein the step of generating encoded color information comprises encoding an object type, object location and color for each of said one or more objects.

7. The method defined in claim 6 wherein the encoded color information comprises machine readable information.

8. The method defined in claim 7 wherein the machine readable information comprises digital paper.

9. The method defined in claim 1 wherein the object type indicator indicates whether or not the object has distinct border pixels.

10. A method for generating a black and white document reproducible in color, said method comprising the steps of:

identifying one or more objects that contain color in the color document;

generating a vector for each of said one or more objects, wherein each vector comprises coordinates of a bounding box in the document image space that at least approximates shape of an object, and an object type indicator;

generating encoded color information containing location and color of said one or more objects in the color document, wherein the step of generating the encoded color comprises encoding, as part of the encoded color information, the vectors for said one of more objects;

printing the black and white document with the encoded color information to enable creation of a color version of the color document.

11. The method defined in claim 10 wherein the step of printing comprises the step of printing the encoded color information in a side channel of the black and white document.

12. The method defined in claim 10 wherein said one or more objects comprises at least one line.

13. The method defined in claim 10 wherein said one or more objects comprises at least one character.

14. The method defined in claim 10 wherein said one or more objects comprises at least one partial image.

15. The method defined in claim 10 wherein the encoded color information comprises at least one color procedure to recreate a color version of a shape in the black and white document.

16. The method defined in claim 10 wherein said one or more objects comprise objects of a plurality of object types.

17. The method defined in claim 10 wherein the step of generating encoded color information comprises encoding an object type, object location and color for each of said one or more objects.

18. The method defined in claim 17 wherein the encoded color information comprises machine readable information.

19. The method defined in claim 18 wherein the machine readable information comprises digital paper.

20. The method defined in claim 10 wherein the object type indicator indicates whether or not the object has distinct border pixels.

21. A method for generating a black and white document reproducible in color, said method comprising the steps of:

identifying at least one bounding box to approximate each of one or more shapes containing color in the document;

generating a vector for each of said one or more shapes, wherein each vector comprises coordinates of a bounding box in the document image space that at least approximates a shape, and a shape type indicator;

generating encoded color information containing location, bounding box and assigned color of said one or more shapes, wherein the step of generating encoded color information comprises encoding, as part of the encoded color information, the vectors for said one or more shapes;

printing the black and white document with the encoded color information to enable creation of a color version of the color document.

22. The method defined in claim 21 wherein the object type indicator indicates whether or not the object has distinct border pixels.

23. An apparatus for generating a black and white document reproducible in color, said apparatus comprising:

means for identifying one or more objects that contain color in the color document;

means for generating a vector for each of said one or more objects, wherein each vector comprises:

coordinates of a bounding box in the document image space that at least approximates shape of an object, and object type indicator;

means for generating encoded color information containing location and color of said one or more objects in the color document, said means for generating encoded color information comprising means for encoding, as part of the encoded color information, the vectors for said one of more objects;

means for printing the black and white document with the encoded color information to enable creation of a color version of the color document.

24. The apparatus defined in claim 23 wherein means for printing comprises means for printing the encoded color information in a side channel of the black and white document.

25. The apparatus defined in claim 23 wherein the encoded color information comprises at least one color procedure to recreate a color version of a shape in the black and white document.

26. The apparatus defined in claim 23 wherein said one or more objects comprise objects of a plurality of object types.

27. The apparatus defined in claim 23 wherein the means for generating encoded color information comprises means for encoding an object type, object location and color for each of said one or more objects.

28. The apparatus defined in claim 27 wherein the encoded color information comprises machine readable information.

29. The apparatus defined in claim 28 wherein the machine readable information comprises digital paper.

30. The apparatus defined in claim 23 wherein the object type indicator indicates whether or not the object has distinct border pixels.

* * * * *